(12) United States Patent
McPheeters

(10) Patent No.: US 9,595,911 B2
(45) Date of Patent: Mar. 14, 2017

(54) TILE ROOF MOUNTING SYSTEMS

(71) Applicant: Sunrun South LLC, San Luis Obispo, CA (US)

(72) Inventor: Greg McPheeters, Santa Cruz, CA (US)

(73) Assignee: Sunrun South LLC, San Luis Obispo, CA (US)

( * ) Notice: Subject to any disclaimer, the term of this patent is extended or adjusted under 35 U.S.C. 154(b) by 0 days.

(21) Appl. No.: 14/919,269

(22) Filed: Oct. 21, 2015

(65) Prior Publication Data

US 2016/0112000 A1   Apr. 21, 2016

Related U.S. Application Data

(60) Provisional application No. 62/066,482, filed on Oct. 21, 2014.

(51) Int. Cl.
*H02S 20/00* (2014.01)
*H02S 20/23* (2014.01)

(52) U.S. Cl.
CPC .................................... *H02S 20/23* (2014.12)

(58) Field of Classification Search
CPC ......... Y02E 10/47; H02S 20/23; H02S 20/00; H02S 20/25; Y02B 10/12; F24J 2/5258; F24J 2/5245
See application file for complete search history.

(56) References Cited

U.S. PATENT DOCUMENTS

| 8,839,575 | B1* | 9/2014 | Liu | H01L 31/0422 248/295.11 |
|---|---|---|---|---|
| 8,844,887 | B2* | 9/2014 | Genschorek | B30B 3/04 182/117 |
| 9,151,519 | B2* | 10/2015 | Esken | F24J 2/5247 |
| 2004/0216399 | A1* | 11/2004 | Yamada | F24J 2/045 52/173.1 |
| 2009/0025313 | A1* | 1/2009 | Smidt | F24J 2/5205 52/173.3 |
| 2015/0060619 | A1* | 3/2015 | Krannich | F24J 2/5247 248/237 |
| 2016/0087576 | A1* | 3/2016 | Johansen | H02S 20/25 52/58 |

FOREIGN PATENT DOCUMENTS

| DE | 202005004348 U1 * | 7/2005 | ............. F24J 2/5247 |
|---|---|---|---|
| DE | 20221913 U1 * | 3/2009 | ............. F24J 2/045 |
| EP | 2333452 A2 * | 6/2011 | ............. F24J 2/5247 |

* cited by examiner

*Primary Examiner* — Rodney Mintz
*Assistant Examiner* — Daniel Kenny
(74) *Attorney, Agent, or Firm* — Kramer Levin Naftalis & Frankel LLP

(57) ABSTRACT

Tile roof mounting systems are disclosed for installing solar panels on a tile roof. The systems may include a base member that can be installed under a tile of the tile roof having two parallel tracks. A first track may include a channel for receiving an end of a tile hook; and the second track may be used to fasten the tile hook to the base member. The tile hook can include a latching region for latching onto the channel, a fastening region that can be fastened to the fastening track, and a supporting region used to support one or more components of a solar panel installation above the roof tiles.

17 Claims, 10 Drawing Sheets

TILE ROOF MOUNTING SYSTEMS

CROSS-REFERENCE TO RELATED APPLICATION

This application claims the benefit of U.S. Provisional Patent Application No. 62/066,482, entitled "TILE ROOF MOUNTING SYSTEMS," filed Oct. 21, 2014, the disclosure of which is hereby incorporated by reference herein in its entirety.

BACKGROUND OF THE DISCLOSURE

Photovoltaic solar panels, or solar modules, are an increasingly popular means of generating renewable power via the photovoltaic effect. Recently, there has been a wide proliferation of solar projects of all sizes, from small residential installations to large utility scale power production.

Because solar modules need maximum exposure to sunlight to operate efficiently, they are often installed on the rooftops of structures or buildings. Rooftops are convenient installation locations because they typically represent unused space on a structure. Rooftops are also less prone to vandalism or theft than locations that are accessible from the ground. While rooftops are often good locations to install solar modules, they introduce a number of complications into the installation process. For instance, rooftop installations introduce increased risk of water leakage as components are fixed through roofing membranes and into structural members below. Rooftop surfaces are often visible and require a smooth, level installation, which is often at odds with the undulating, settled surfaces common in roof surfaces. Working on roof surfaces typically introduces numerous access and safety challenges which must be overcome, and therefore limiting the amount of time for installation or maintenance on the roof is highly advantageous to an installer. Furthermore, installing solar panels on tiled roofs may be especially challenging because the materials used for typical roof tiles may not be capable of structurally supporting solar installations.

SUMMARY OF THE DISCLOSURE

Mounting systems, particularly tile roof mounting systems, are disclosed. Tile roof mounting systems can include a base member couplable to a surface, such as the underlying surface of a tile roof. The base member may include two parallel tracks, namely a latching track and a fastening track. The latching track can include a longitudinally-aligned channel configured to receive an end of a tile hook, and the fastening track may be capable of receiving a fastener that couples the tile hook to the base member.

Tile hooks for use with the disclosed systems may be used to support one or more elements of a solar panel installation above the installation surface. Although the tile hooks can be integrally formed, each tile hook may include a latching region that can latch into the channel of the latching track, a fastening region for coupling the tile hook to the fastening track, and a support region for supporting one or more elements of a solar panel installation. Tile hooks can be installed at any point along the tracks of the base member with a single fastener to provide flexibility during installation.

In some embodiments, a mounting apparatus can be provided. The mounting apparatus can include a base member having a latching track and a fastening track adjacent the latching track. The mounting apparatus can also include a hook couplable to the base member. The hook can have a latching region configured to latch onto the latching track, a fastening region configured to fasten to the fastening track, and a supporting region extending from the fastening region. The supporting region can be supportable by the base member when the hook couples to the base member.

In some embodiments, a system can be provided that includes a solar panel installation component and a mounting device. The mounting device can include a first member having parallel tracks, and a second member having a latching section configured to latch onto a first one of the tracks. The mounting device can also include a fastening section configured to fasten to a second one of the tracks, and a side section extending from the fastening section and couplable to the solar panel installation component.

In some embodiments, a method of installing a mounting system to a surface can be provided. The mounting system can have a base component and a hook component. The base component can include adjacent tracks. The method can include coupling the base component to the surface, inserting an end of the hook component into a channel disposed in a first one of the tracks, positioning a portion of the hook component over a second one of the tracks, and fastening the portion of the hook component to the second one of the tracks.

BRIEF DESCRIPTION OF THE DRAWINGS

For a fuller understanding of the inventive embodiments, reference is made to the following description taken in connection with the accompanying drawings in which.

DETAILED DESCRIPTION OF THE PREFERRED EMBODIMENTS

Figure 1:
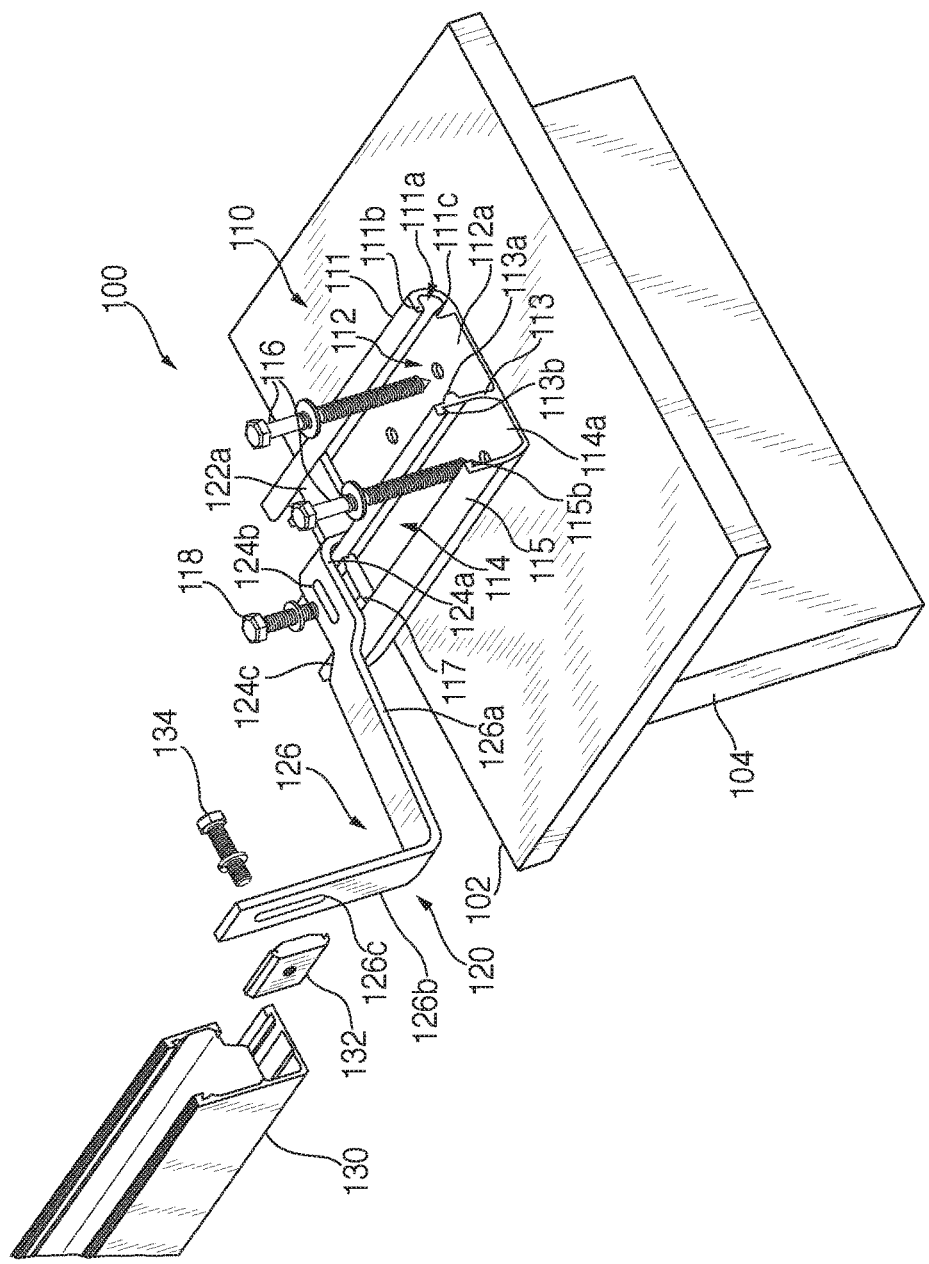
FIG. 1 shows a partially exploded perspective view of a tile roof mounting system, in accordance with some embodiments.

FIG. 1 shows a partially exploded perspective view of tile roof mounting system 100 for securing a solar panel system to a surface, in accordance with some embodiments. System 100 may include base member 110 couplable to surface 102 and tile hook 120 couplable to base member 110. Although surface 102 may be any surface suitable for mounting a solar panel system, the embodiments disclosed herein may be particularly useful for installing solar panels on a tile roof. Accordingly, surface 102 may be the surface underlying the tiles of a tile roof.

Base member 110 can include two parallel tracks, namely latching track 112 and fastening track 114 separated by divider 113. Latching track 112 may be a substantially C-shaped structure defined by divider 113 and latching wall 111, which can run substantially parallel to divider 113, extending from latching track base 112a in a direction pointing substantially perpendicularly away from surface 102. Similarly, fastening track can be a substantially C-shaped structure defined by divider 113 and fastening wall 115, which can run substantially parallel to divider 113, extending from fastening track base 114a in a direction pointing substantially perpendicularly away from surface 102.

Fasteners 116 can extend through one or more apertures in latching track base 112a and/or fastening track base 114a to couple base member 110 to surface 102. In order to fasten base member 110 securely to surface 102, fasteners 116 may extend through surface 102 into one or more components that may be positioned beneath surface 102, such as, for example, rafters 104. Fasteners 116 may be any suitable fasteners, such as bolts (e.g., lag bolts), screws, or nails, for example.

In order to retain tile hook 120, base member 110 can include channel 111a defined in latching wall 111. Channel 111a can open into the interior of latching track 112 toward divider 113 and may run the full length or a partial length of latching wall 111. That is, channel 111a may be considered a recess in the interior surface of latching wall 111 defined by latching wall 111 itself as well as upper latching flange 111b, which can extend from latching wall 111 toward divider 113, and lower latching flange 111c, which can extend substantially perpendicularly from latching track base 112a to support tile hook 120 above the level of the heads of fasteners 116. Upper latching flange 111b and lower latching flange 111c may be laterally offset (as is readily apparent in FIG. 2) in order to facilitate reception of tile hook 120 at an angle. Once so inserted, tile hook 120 may be rotated down towards surface 102 to create an interference fit in channel 111a. In some implementations, lower latching flange 111c may be omitted, and tile hook 120 can rest on latching track base 112a, the head of fastener 116, or on a separate spacer member provided to support tile hook 120 above fastener 116.

Divider 113 may include spacer fin 113a, which can help to ensure that tile hook 120 has enough clearance between latching wall 111 and divider 113 to be rotated into place while latching into channel 111a.

In addition to the interference fit between tile hook 120 and channel 111a, tile hook 120 can be coupled to base member 110 at fastening track 114. Generally speaking, tile hook 120 may be coupled to base member 110 at fastening track 114 using any suitable fastening mechanism, such as the bolt, washer, and channel nut assembly depicted in FIGS. 1 and 2, or a single fastener that extends through an aperture of base member 110 and potentially into surface 102, for example. For the coupling assembly shown, channel nut 117, which can span substantially the width of fastening track 114, can include flanged edges 117a (see FIG. 2) configured to engage flanges 113b and 115b of divider 113 and fastening wall 115. For this purpose, flanges 113b and 115b can extend inwardly away from divider 113 and fastening wall 115 in a direction toward fastening track 114. Channel nut 117 may also include a threaded aperture for receiving threaded fastener 118, such that when threaded fastener 118 is tightened in the threaded aperture, channel nut 117 is pulled into engagement with flanges 113b and 115b and tile hook 120 is fastened to base member 110.

Alternatively, tile hook 120 may be provided with features configured to "snap" into fastening track 114. For example, tile hook 120 can include, or be coupled to, two protruding members (not shown) having flanged ends that, when inserted into fastening track 114, clip into flanges 113b and 115b.

Tile hook 120 can include three main regions: latching region 122, which can be latched to latching track 112 of base member 110; fastening region 124, which can be fastened to fastening track 114; and supporting region 126, which may be used to support one or more elements of a solar panel installation.

Latching region 122 may be a generally L-shaped region, having horizontal arm 122a and vertical arm 122b, arranged at one end of tile hook 120. The length of horizontal arm 122a can be chosen to substantially span the width of latching track 112. For example, the length of horizontal arm 122a can be equal to or slightly shorter than the width of latching track 112. In this way, a distal end of horizontal arm 122a, opposite the side joined or attached to vertical arm 122b, can be slid into channel 111a. The thickness of horizontal arm 122a may be chosen to create an interference fit between upper latching flange 111b and lower latching flange 111c when horizontal arm 122a is inserted into channel 111a and tile hook 120 is rotated downward toward surface 102. When tile hook 120 is rotated into position, vertical arm 122b can rest against spacer fin 113a of divider 113. Vertical arm 122b can extend perpendicularly away from horizontal arm 122a in a direction substantially perpendicularly away from surface 102, as shown. The height of vertical arm 122b can be chosen to extend just above the level of the top of divider 113 as measured starting from an upper surface of lower latching flange 111c.

Fastening region 124 can include horizontal arm 124a, which can extend substantially perpendicularly from vertical arm 122b in a plane substantially parallel to the plane of horizontal arm 122a. Horizontal arm 124a can span the gap of and atop divider 113 and fastening wall 115 when installed. Aperture 124b in fastening region 124 can accept fastener 118 for coupling tile hook 120 to fastening track 114 as described above. Oblique arm 124c can extend at an angle (e.g., 135°, 150°, 160°, or 170°) from horizontal arm 124a.

Supporting region 126 can include horizontal clearance arm 126a, which can extend obliquely from oblique arm 124c in a plane substantially parallel to or at a shallow angle (e.g., 165°, 170°, or 175°) from the plane of horizontal arm 124a. The length of horizontal arm 126a may be chosen to allow supporting arm 126b to extend out from underneath a roof tile. Accordingly, the length of horizontal arm 126a may be varied depending on the dimensions of the roof tile under which base member 110 is installed. Support arm 126b of supporting region 126 can extend away from horizontal arm 126a in a direction substantially perpendicularly away from surface 102, when mounting system 100 is installed. The height of support arm 126b can be chosen to support one or more components of a solar panel installation above roof tiles installed on surface 102 with suitable clearance (e.g., 5-10" clearance). In some embodiments, support arm 126b can include aperture 126c to receive one or more fasteners for fastening solar panel installation components to tile hook 120.

It should be understood that all of the angles listed above are exemplary and variance from these exemplary figures may be warranted depending on the geometries of the roof tiles, the nature of surface 102, and other factors. Furthermore, angles between various regions of tile hook 120 may vary when placed under load as installed.

As depicted in FIG. 1, system 100 can be coupled to rail 130 using channel nut 132 and fastener 134. However, it should be understood that any suitable component of a solar panel installation may be coupled to support arm 126.

Figure 2:
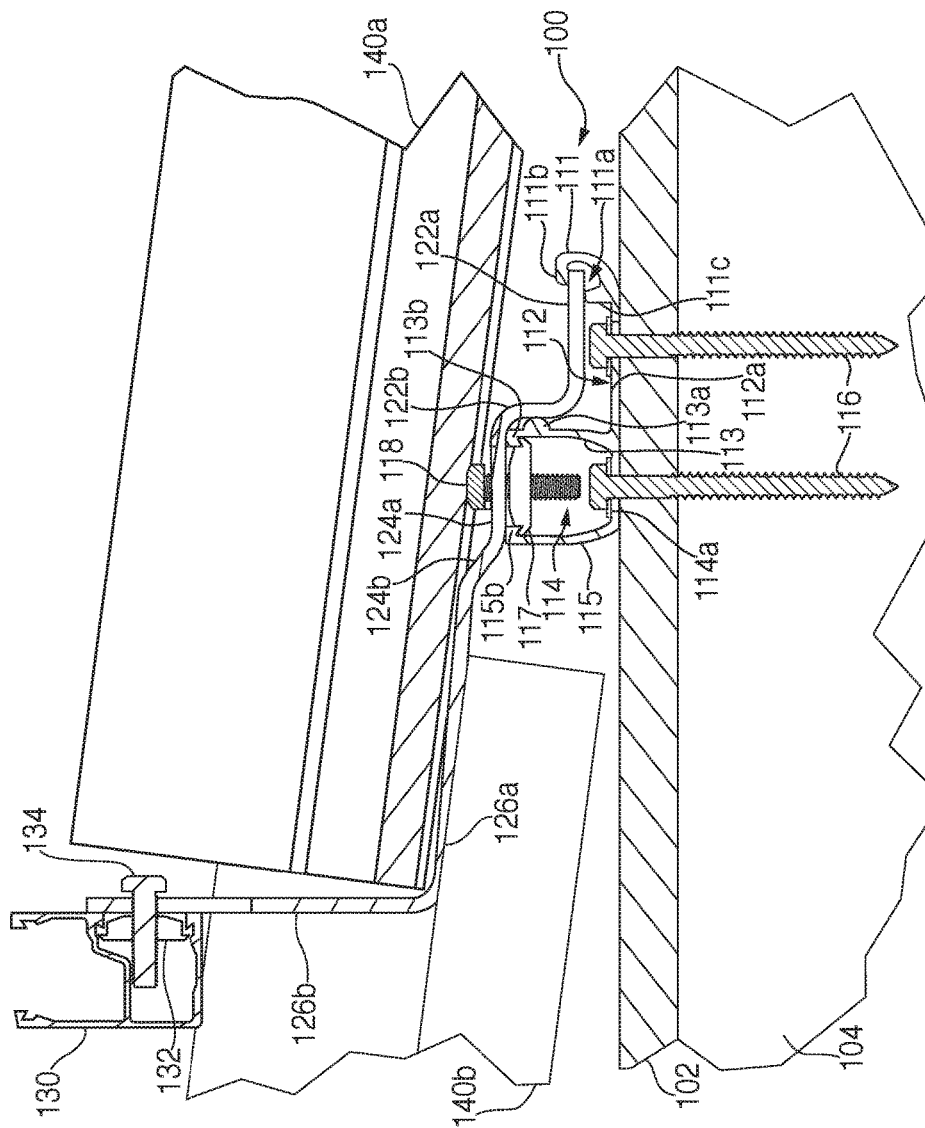
FIG. 2 shows a cross sectional view of a tile roof mounting system, in accordance with some embodiments.

FIG. 2 shows a cross sectional view of system 100 installed on surface 102 underlying roof tiles 140a and 140b.

In particular, base member 110 is installed under roof tile 140a with horizontal clearance arm 126a allowing support arm 126b to extend out from under roof tile 140a above adjacent roof tile 140b.

Figure 3:
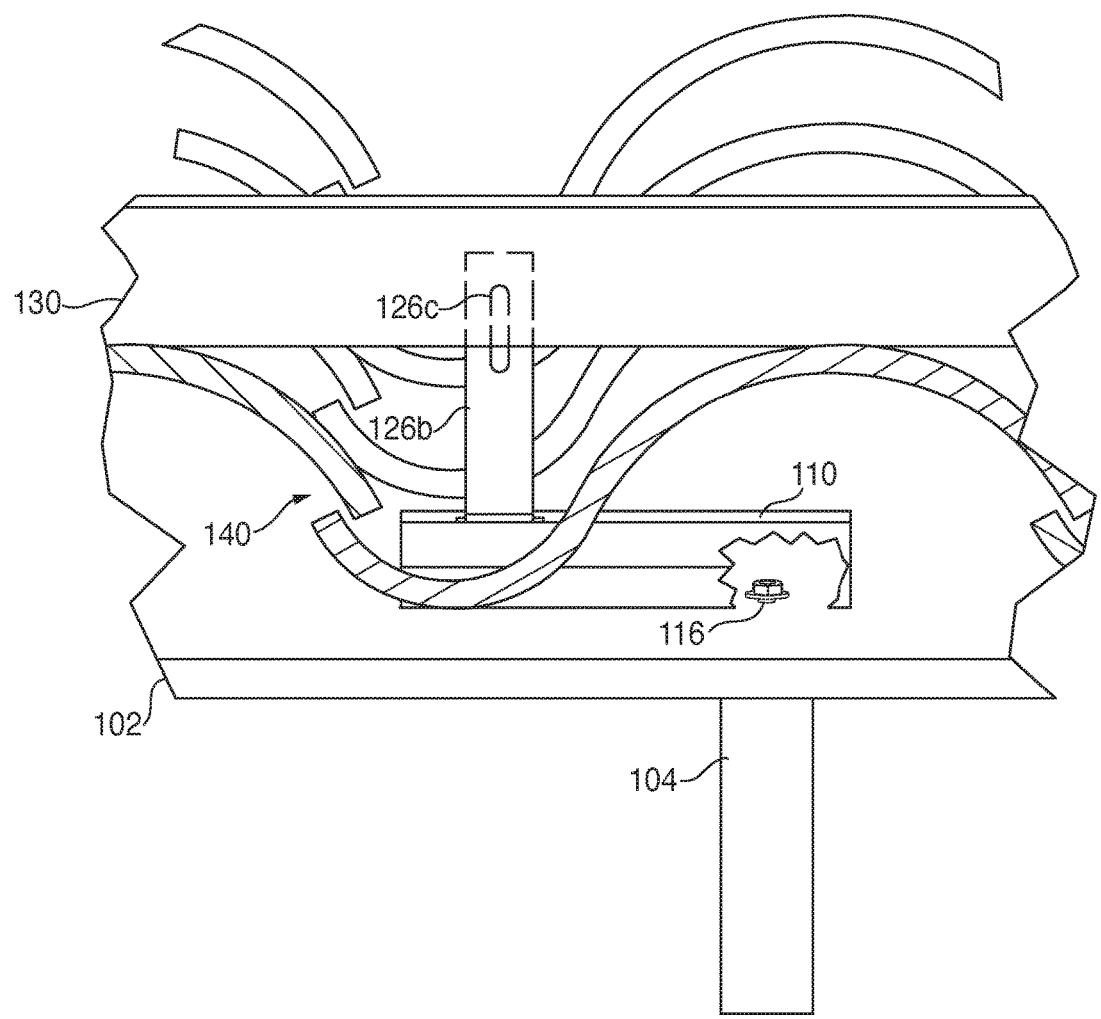
FIG. 3 shows another cross sectional view of a tile roof mounting system, in accordance with some embodiments.

FIG. 3 shows another cross sectional view of system 100, in accordance with some embodiments. In particular, FIG. 3 illustrates how base member 110 may be arranged underneath roof tiles 140. Support arm 126b may pass between and extend above adjacent roof tiles to support rail 130 thereabove. Although not shown in FIG. 3, a fastener (e.g., fastener 134 of FIG. 2 may be provided through aperture 126c to couple rail 130 to support arm 126b.

Figure 4A:
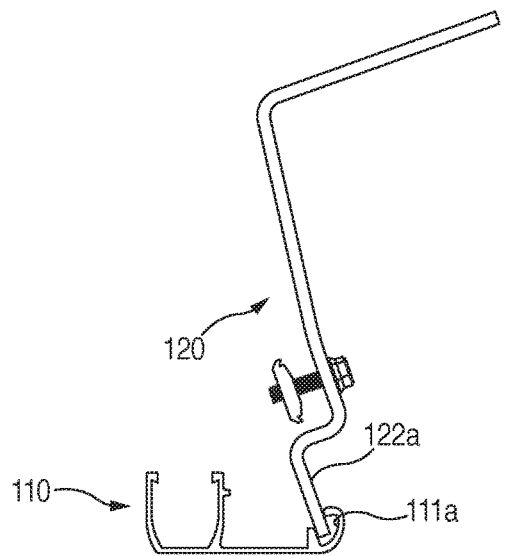
FIGS. 4A-4F show side views of a tile roof mounting system during various stages of assembly, in accordance with some embodiments.
Figure 4B:
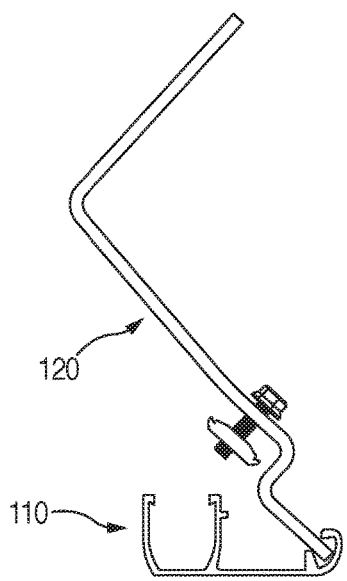
Figure 4C:
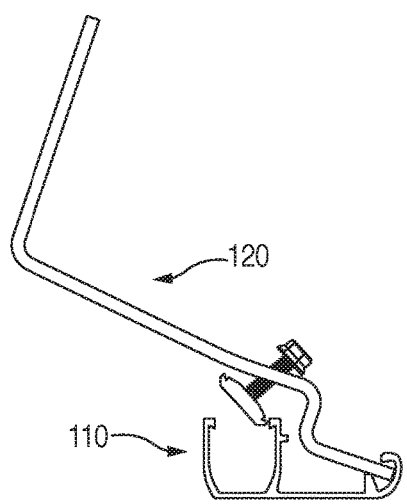
Figure 4D:
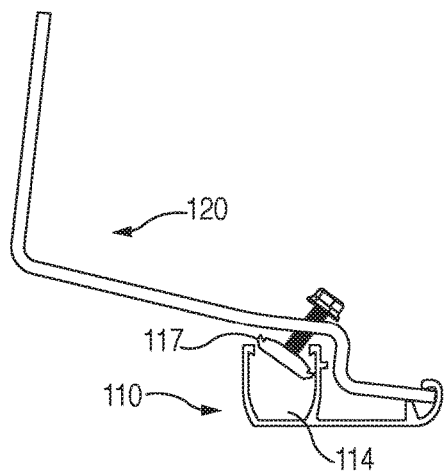
Figure 4E:
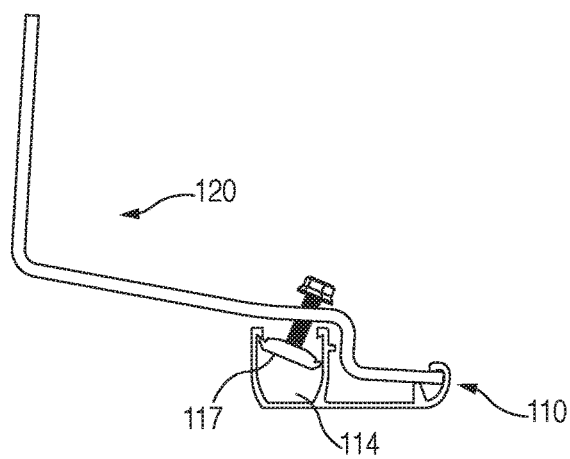
Figure 4F:
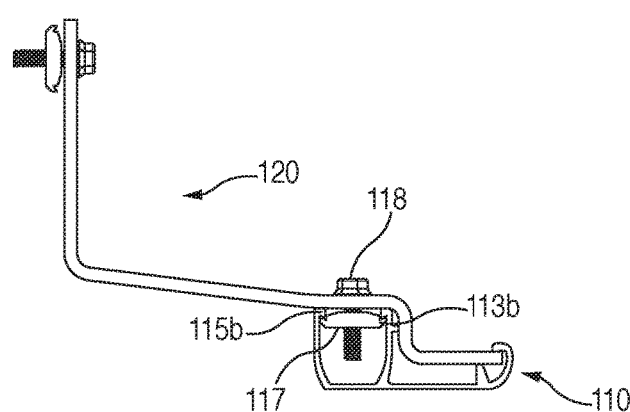

FIGS. 4A-4F show side views of tile roof mounting system 100 during various stages of assembly, in accordance with some embodiments. In particular, FIGS. 4A-4F demonstrate, step by step, the manner in by which tile hook 120 may be coupled to base member 110. First, horizontal arm 122a can be inserted into channel 111a as shown in FIG. 4A. Next, tile hook 120 can be rotated down toward the installation surface (not shown) as depicted in FIGS. 4B and 4C. As tile hook 120 is rotated into position, channel nut 117 can be guided into fastening track 114 as depicted in FIGS. 4D and 4E. Lastly, as shown in FIG. 4F, fastener 118 can be tightened, thereby pulling channel nut 117 into engagement with flanges 113b and 115b and coupling tile hook 120 to base member 110. Accordingly, installation of tile hook 120 is particularly easy, requiring, in some embodiments, only a single fastener to complete the assembly.

Figure 5A:
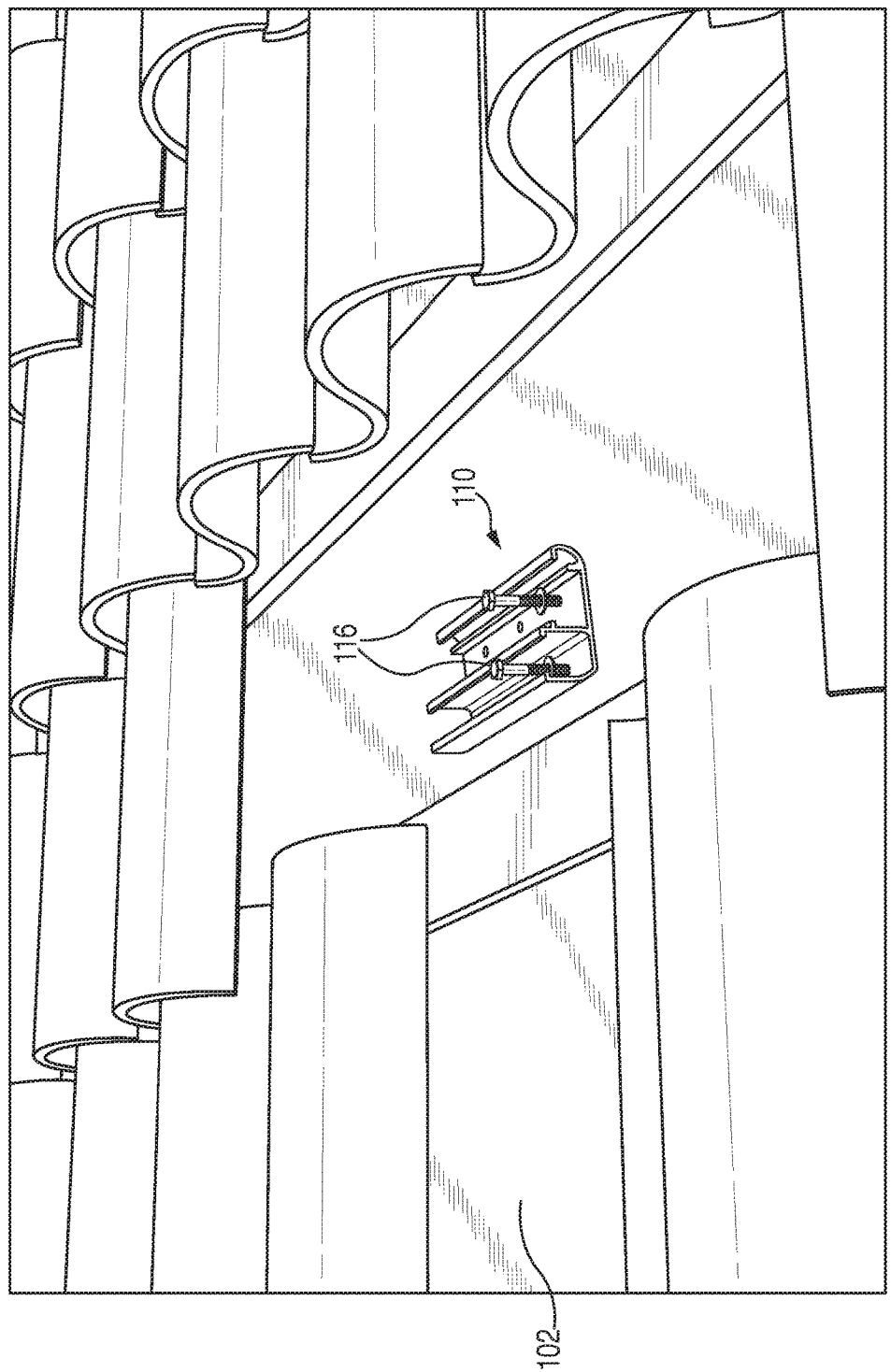
FIGS. 5A-5D show perspective views of a tile roof mounting system during various stages of assembly, in accordance with some embodiments.
Figure 5B:
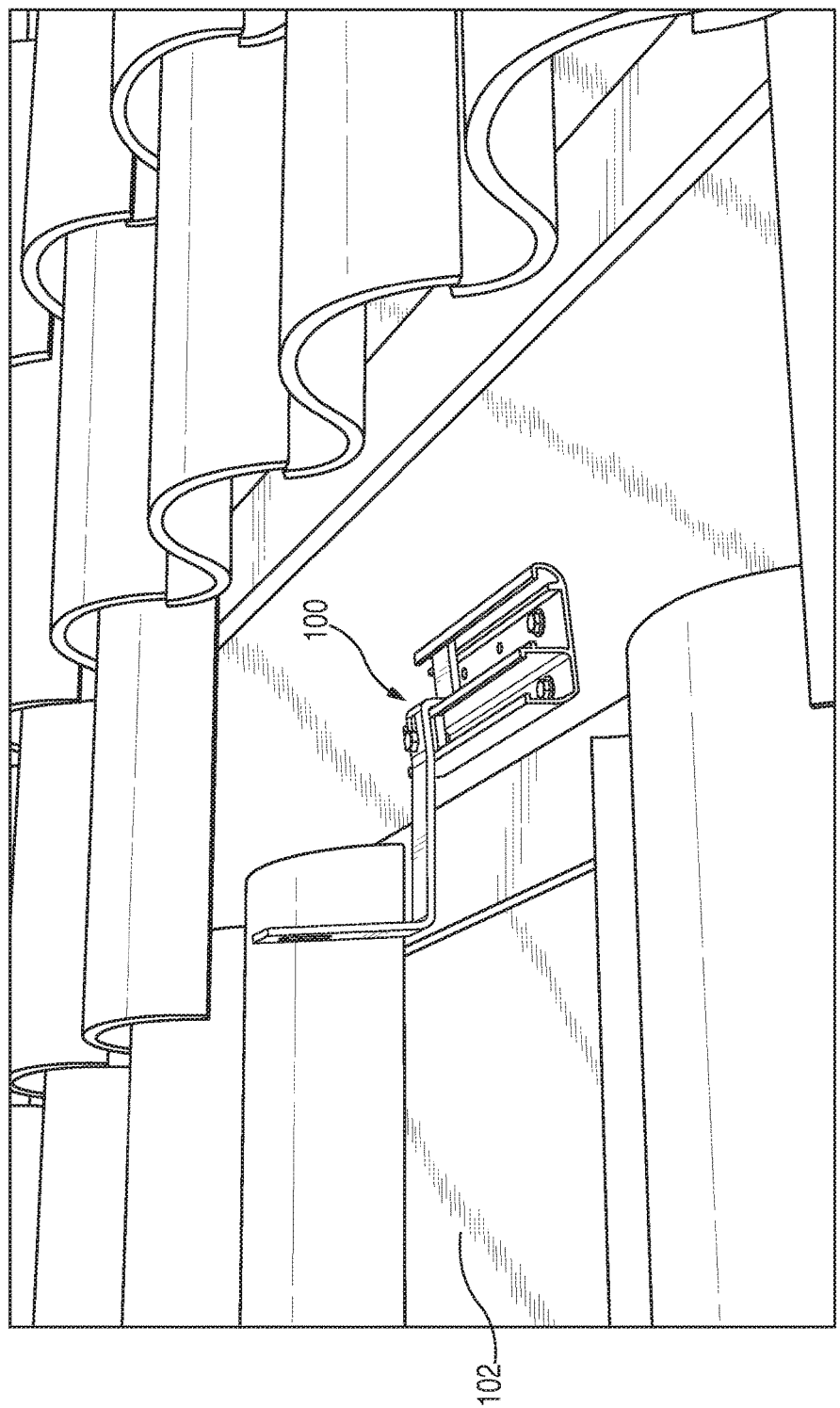
Figure 5C:
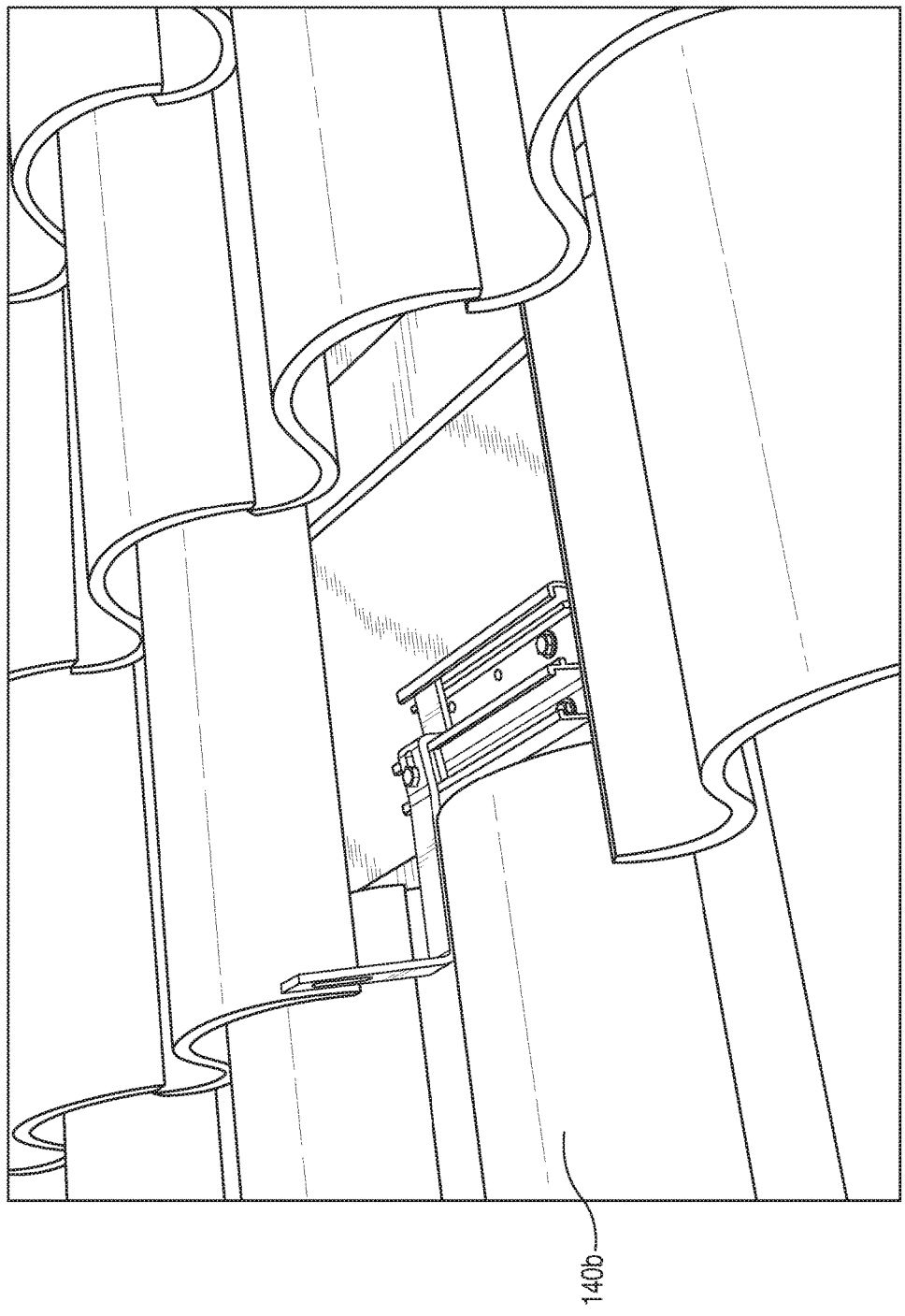
Figure 5D:
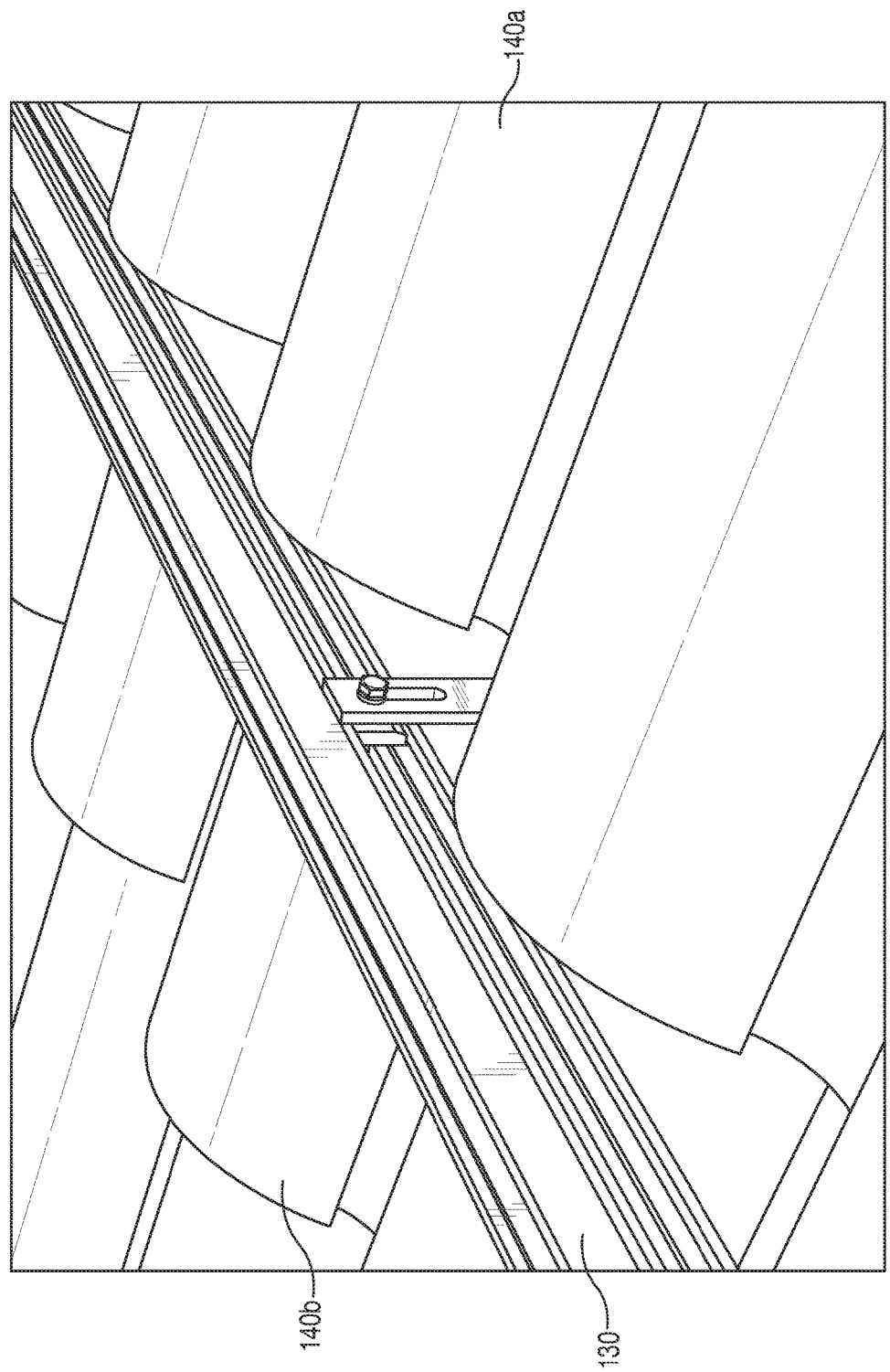

FIGS. 5A-5D show perspective views of a tile roof mounting system during various stages of assembly, in accordance with some embodiments. In particular, FIGS. 5A-5D demonstrate, step by step, the manner by which system 100 can be coupled to surface 102. As shown in FIG. 5A, base member 110 can be fastened to surface 102 using fasteners 116. Next, tile hook 120 can be coupled to base member 110 as depicted in FIG. 5B. FIG. 5C depicts roof tile 140b reinstalled under tile hook 120. Lastly, FIG. 5D shows roof tile 140a reinstalled above tile hook 120 and rail 130 coupled to tile hook 120 above the surface of the roof tiles.

Figure 6:
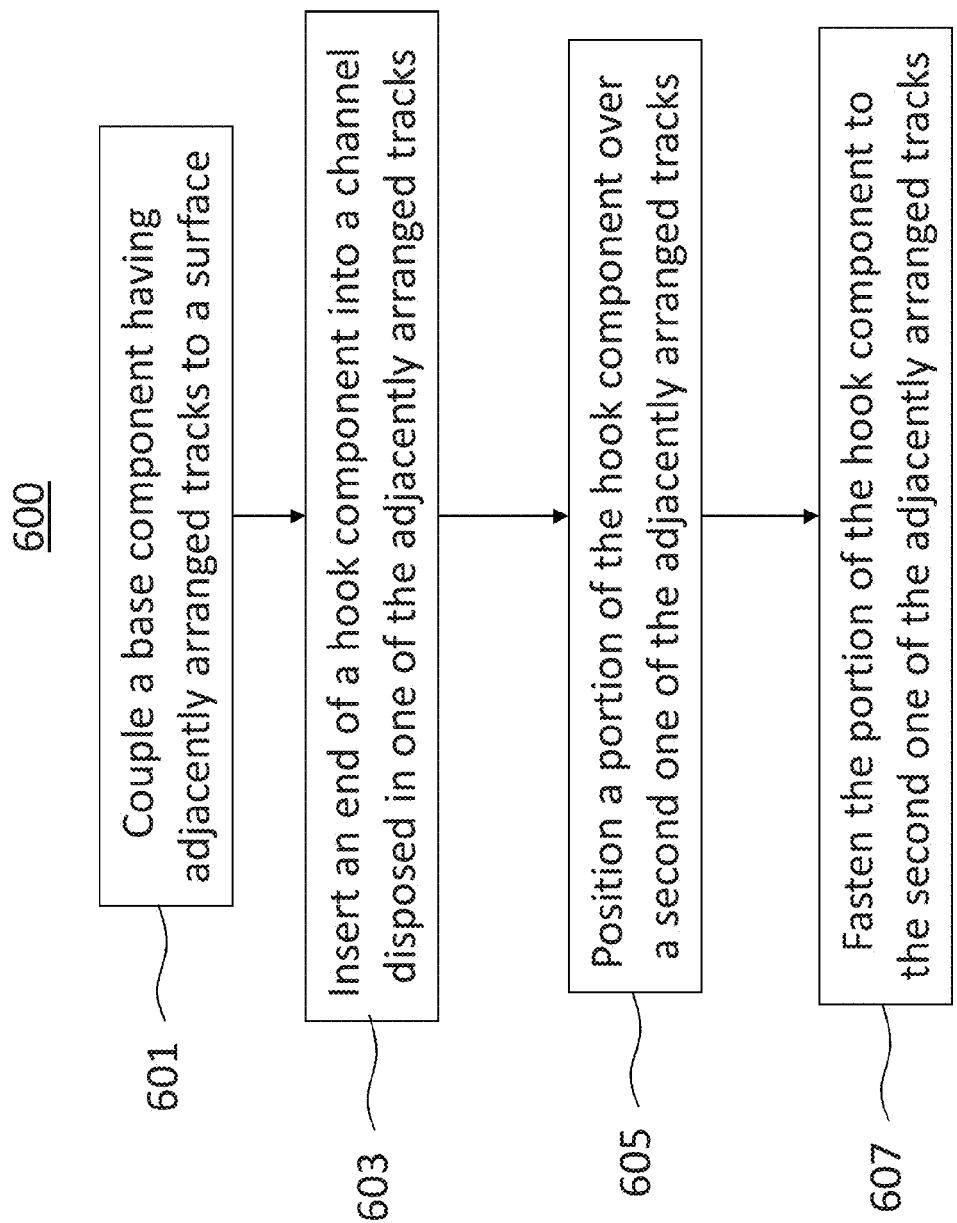
FIG. 6 shows a flow chart of an exemplary method of installing a tile roof mounting system, in accordance with some embodiments.

FIG. 6 shows a flow chart of an exemplary method 600 of installing a tile roof mounting system, in accordance with some embodiments. At step 601, a base member (e.g. base member 110 of FIG. 1) may be fastened to a surface (e.g. surface 102 of FIG. 1). The base member may have a number of adjacently arranged tracks (e.g. latching track 112 and fastening track 114 of FIG. 1). Any suitable type of fastener (e.g. fasteners 116 of FIG. 1) may be used to fasten the base member to the surface.

A step 603, the end of a hook component (e.g. latching region 122 of tile hook 120) may be inserted into a channel (e.g. channel 111a defined in latching wall 111 of FIG. 1) disposed in one of the adjacently arranged tracks, such as a latching track, for example. At step 605, a portion of the hook component (e.g. fastening region 124 of tile hook 120) can be positioned over a second one of the adjacently arranged tracks, such as a fastening track, for example. The portion of the hook component may be positioned, for example, by rotating the hook component towards the surface while the end of the hook component is engaged in the channel.

At step 607, the portion of the hook component can be fastened to the second one of the adjacently arranged tracks. In some embodiments, a channel nut (e.g. channel nut 117 of FIG. 1), which can include a threaded aperture for receiving a fastener may be provided in the second of the adjacently arranged tracks. When the fastener is inserted through an aperture in the portion of the hook component and tightened in the threaded aperture, the channel nut can be pulled into engagement with flanges provided in the track such that the hook component is fastened the base member.

It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

What is claimed is:

1. A mounting apparatus comprising:
   a base member having a latching track and a fastening track adjacent the latching track; and
   a hook couplable to the base member, the hook having a latching region configured to latch onto the latching track, a fastening region configured to fasten to the fastening track, and a supporting region extending from the fastening region, the supporting region being supportable by the base member when the hook couples to the base member, wherein the base member further comprises a latching wall, a fastening wall, and a divider disposed between the latching and fastening walls, the latching track being defined by the latching wall and the divider, the fastening track being defined by the fastening wall and the divider, and wherein:
   the fastening region comprises a first aperture; and
   the base member further comprises:
      a first flange extending from the fastening wall; and
      a second flange extending from the divider.

2. The mounting apparatus of claim 1, wherein the latching track and the fastening track are parallel to one another.

3. The mounting apparatus of claim 1, wherein the fastening region is disposed between the latching region and the supporting region.

4. The mounting apparatus of claim 1, wherein the latching region comprises substantially orthogonal arms, at least one of the substantially orthogonal arms being joined to the fastening region.

5. The mounting apparatus of claim 1, wherein the supporting region is substantially L-shaped.

6. The mounting apparatus of claim 1, wherein the supporting region comprises at least one aperture, the mounting apparatus further comprising:
   at least one fastener configured to secure at least one solar panel installation component to the supporting region via the at least one aperture.

7. The mounting apparatus of claim 1, wherein the base member further comprises a spacer fin extending from the divider toward the latching wall, the spacer fin being configured to interact with a portion of the latching region when the latching region is latched onto the latching track.

8. The mounting apparatus of claim 1, further comprising a channel nut having a second aperture and flanged edges configured to interact with the first and second flanges, when the channel nut is positioned in the fastening track and the first and second apertures are aligned with one another.

9. The mounting apparatus of claim 8, further comprising:
   a fastener configured to secure the channel nut to the fastening track via the first and second apertures.

10. The mounting apparatus of claim 1, wherein the latching track comprises a channel, the latching region being insertable into the channel.

11. The mounting apparatus of claim 10, wherein the base member further comprises:
   a first flange extending from a latching wall in a first direction; and a second flange extending from the latching track in a second direction substantially orthogonal to the first direction, the channel being defined by the latching wall and the first and second flanges.

12. The mounting apparatus of claim 11, wherein a distance between the first and second flanges and a thickness of the latching region creates an interference fit between the latching region and the channel, when the latching region is inserted into the channel.

13. The mounting apparatus is claim 1, wherein at least one of the latching track and the fastening track comprises at least one aperture.

14. The mounting apparatus of claim 13, further comprising at least one fastener configured to secure the base member to a surface via the at least one aperture.

15. A system comprising:
a solar panel installation component; and
the mounting apparatus according to claim 1, wherein the solar panel installation component is coupled to the supporting region of the mounting apparatus.

16. The system of claim 15, wherein the solar panel installation component comprises a rail.

17. A method of installing a mounting system to a surface, the mounting system having a base component and a hook component, the method comprising:
coupling the base component to the surface, the base component having adjacent tracks;
inserting an end of the hook component into a channel disposed in a first one of the adjacent tracks;
positioning a portion of the hook component over a second one of the adjacent tracks, wherein positioning the portion of the hook component over the second one of the adjacent tracks comprises rotating the portion of the hook component toward the surface; and
fastening the portion of the hook component to the second one of the adjacent tracks.

\* \* \* \* \*